(12) United States Patent
Chien et al.

(10) Patent No.: US 6,404,938 B1
(45) Date of Patent: Jun. 11, 2002

(54) DUMMY CLOCK CONTROL METHOD AND APPARATUS FOR A SEQUENTIAL I/O DEVICE

(75) Inventors: Chun-Tsai Chien, Taichung; Chun-Liang Lin, Hsinchu, both of (TW)

(73) Assignee: Umax Data Systems Inc., Hsinchu (TW)

(*) Notice: Subject to any disclaimer, the term of this patent is extended or adjusted under 35 U.S.C. 154(b) by 0 days.

(21) Appl. No.: 09/233,214

(22) Filed: Jan. 20, 1999

(51) Int. Cl.$^7$ .............................. G06K 7/00; H04N 1/04
(52) U.S. Cl. ..................... 382/312; 358/474; 358/486; 358/483
(58) Field of Search .......................... 382/312; 358/474, 358/482, 471, 486, 494, 505, 483; 348/294, 295, 297, 298

(56) References Cited

U.S. PATENT DOCUMENTS 5,390,032 A * 2/1995 Yamamoto et al. ......... 358/474
5,442,465 A * 8/1995 Compton ..................... 358/482
6,151,426 A * 11/2000 Lee et al. .................... 382/319

* cited by examiner

Primary Examiner—Wenpeng Chen
(74) Attorney, Agent, or Firm—McDermott, Will & Emery

(57) ABSTRACT

A method and apparatus for speeding up the reading speed of a sequential I/O device, such as a Charge Coupled Device, is disclosed. The method involves in providing normal clocks for reading selected pixels and dummy clocks for reading unselected pixels. Since dummy clocks are faster than normal clocks, therefore the total time for processing the document can be less than using clocks of uniform speed. The apparatus of the invention comprises: a clock control device for generating two transfer pulses φ1 and φ2 in response to a clock cycle. The transfer pulses φ1 and φ2 are input to a sequential I/O device. The signal charge generated from the sequential I/O device will then output to an AND converter to be converted into digital signals. If the digital signals are marked, they will be latched. If not, they will simply be ignored.

6 Claims, 5 Drawing Sheets

DUMMY CLOCK CONTROL METHOD AND APPARATUS FOR A SEQUENTIAL I/O DEVICE

BACKGROUND OF THE INVENTION

A. Field of the Invention

The present invention relates to a clock control method and apparatus, especially to a dummy clock control method and apparatus for a sequential Input/Output device, such as a charge coupled device.

B. Description of the Prior Art

A sequential I/O device, such as a charge coupled device (hereinafter referred to as CCD), sequentially reads the image pixels of a document in response to clock cycles. Each pixel is processed and read according to uniform clock cycles. In the following, the structure and operation of a conventional CCD will be described in detail.

Refer to FIG. 1, basically the structure of a CCD consists of a MOS capacitor with an electrode 13 attached on top of the silicon dioxide 12 on the semiconductor substrate surface 11 as shown in FIG. 1. When signal charge 17 is supplied between the electrode 13 and substrate 11, a depletion layer 15 is formed at the region near the interface of silicon dioxide 12 and substrate 11, resulting this region becomes the low energy level of potential well for the minority carrier 14. If the signal charge 17 generated by light radiation is injected into this potential well 15, these signals are temporarily stored and memorized as analog quantities. When the potential wells are arranged in an array, they function like a shift register.

Accordingly, the CCD analog shift register is operated and described in FIG. 2A. Refer to FIG. 2A, multiple MOS capacitor units $\phi 1$, $\phi 2$, $\phi 3$, $\phi 4$, $\phi 5$ are arranged in close proximity. From FIGS. 2A–2D, we can see that the signal charge 21, 22 is transferred from one MOS capacitor to the neighboring one step by step. The transition of the signal charge can be illustrated more clearly from FIG. 2E. In FIG. 2E, the horizontal lines represent signal charges while the vertical lines the clock times. At time t1, when the signal charge stored under electrode $\phi 1$ applies positive voltage to electrode 42, a portion of the signal charge shifts beneath electrode $\phi 2$ at time t2. At time t3, the positive voltage of electrode $\phi 1$ is decreasing. And at time t4, the entire signal charge beneath electrode $\phi 1$ shifts to electrode $\phi 2$. For next four clock times, the entire signal charge beneath electrode 42 will shift to electrode 43. Consequently, when this operation is done repeatedly, the signal charge beneath electrode $\phi 1$ will shift to the last electrode step by step to complete the image reading of each pixel.

A conventional CCD image sensor consists of three main regions: photo sensitive region, transfer region, and output circuit region. The photo sensitive region refers to pn photo diode array for converting the energy of light into signal charge and temporarily stores the signal charge obtained. The transfer region refers to the CCD analog shift register which has a scanning function to consecutively transfer the signal charge generated at the photo sensing region. The output circuit region refers to floating capacitor source follower for converting the signal charge transferred from the transfer region into voltage. The voltage of floating capacitor is varied according to the signal charge.

As to the transfer region, a simple two-phase drive is normally used with the clock pulses for charge transfer. The operation of the two-phase drive can be illustrated from FIGS. 3A to 3D. As shown in FIG. 3A, at time t1, one potential well $\phi 1$ is responsible for charge storage and the neighboring one $\phi 2$ has a role of isolating the charge of each pixel. Since two wells operate as one set, one pixel in the photo sensing region corresponds to two potential wells. Therefore, a picture signal of one pixel is output for one cycle of the transfer clock pulses. At time t2, the charge in one potential well is being transferred to its neighboring well. At time t3, the charge transfer is complete and the charge in each potential well has been moved to its next potential well. The charge transfer for $\phi 1$ and $\phi 2$ during each clock cycle will be as illustrated in FIG. 3D.

Since the operation of the transfer region relies on uniform clock cycles to read each pixel in uniform speed, therefore the scanning speed for reading a document of A4 size is the same as that for reading the image of a 4×6 photo. In other words, the speed of the CCD is always the same regardless of the actual selected area for scanning. It is definitely not a desirable result because a user would expect that the scanning time would be proportional to the size of a scanned image. That is, the time to finish scanning a 4×6 photo shall be much faster than the scanning time for an A4 size document.

SUMMARY OF THE INVENTION

Accordingly, it is a primary object of the present invention to provide a method and apparatus which can speed up image reading speed for a sequential I/O device by using dummy clocks for unselected pixels.

It is another object of the present invention to utilize dummy clocks which are faster than normal clocks for processing unselected pixels, thereby to reduce the total time for processing the entire array of pixels.

It is a further object of the present invention to process selected and unselected image data using clocks of different speeds, thereby to target on selected image data and reduce the time for processing unselected image data.

Accordingly, the method of the present invention provides different clock cycles for target pixels and unselected pixels. If the portion of the scanned image is target pixels, the clock cycles for reading these target pixels will be normal. In contrast, if the portion of the scanned image is unselected pixels, the system will provide dummy clock cycles for reading unselected pixels. Since the dummy clocks are faster than normal clocks, therefore the overall scanning speed will be improved. The method comprises the steps of: first, marking unselected pixels for the entire document, such as using "0" to represent unselected pixels and "1" to represent selected pixels. Second, detecting if the pixel read is marked. If yes, generating dummy clocks for processing the pixels. Otherwise, the speed of the clocks remains normal.

The preferred embodiment of the present invention comprises: a clock control device following the method of the present invention to generate two transfer pulses $\phi 1$ and $\phi 2$ in response to a clock. The transfer pulses $\phi 1$ and $\phi 2$ are input to the sequential I/O element, which may be implemented as a CCD. The signal charge will then output to an A/D converter to be converted into digital signals. If the digital signals are marked, they will be latched. If not, they will simply be ignored.

BRIEF DESCRIPTION OF THE DRAWINGS

These and other objects and advantages of the present invention will become apparent by reference to the following description and accompanying drawings wherein.

DETAILED DESCRIPTION OF THE PREFERRED EMBODIMENTS

A preferred embodiment of the invention is described below. This embodiment is merely exemplary. Those skilled in the art will appreciate that changes can be made to the disclosed embodiment without departing from the spirit and scope of the invention.

The problem for the prior art as explained above is in the uniform clock control for either selected or unselected pixels. Consequently, the reading speed cannot be varied according to the size of the scanned image. The present invention intends to solve this problem by providing a method and apparatus for dummy clock controls so that a sequential I/O device can process unselected pixels according to dummy clocks, thereby to improve the speed of image reading.

In general, the operation of a sequential I/O device, such as a CCD image sensor, requires power supply, ground, shift pulse, transfer pulses and reset pulses. The shift pulse switches the shift gate On or Off. Since the entire signal charge of the photo sensing region is transferred to the transfer region when the shift gate is switched ON, the integration time of the signal is the same as the cycle of shift pulse. After the shift gate is switched OFF, the signal charge is sequentially transferred to the sift register by transferring pulses $\phi 1$ and $\phi 2$, and the signal charge flows into the floating capacitor through the output gate.

Accordingly, take the two-phase drive for an example, the inventive method intends to control the clocks of the transfer pulses $\phi 1$ and $\phi 2$ in a manner that the clocks for unselected area of images will be replaced by dummy clocks. And dummy clocks are faster than normal clocks. It is known that when transferring the charge from one well to the next one, not 100% of the charge is transferred to the next well; a fraction of it remains in the original well. That is why a clock cycle must be long enough to transfer the charge. Nevertheless, for the unselected area of image, the quality of image is not concerned, therefore the dummy clocks can be faster than normal clocks.

Figure 1:
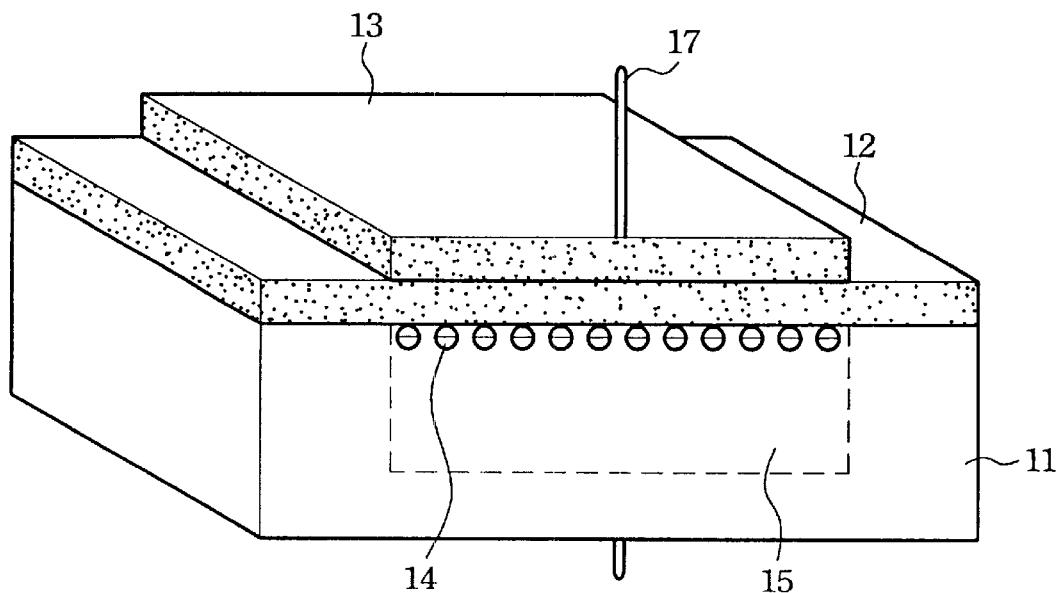
FIG. 1 is a sectional view showing the structure of a conventional charge coupled device.
Figure 2A:
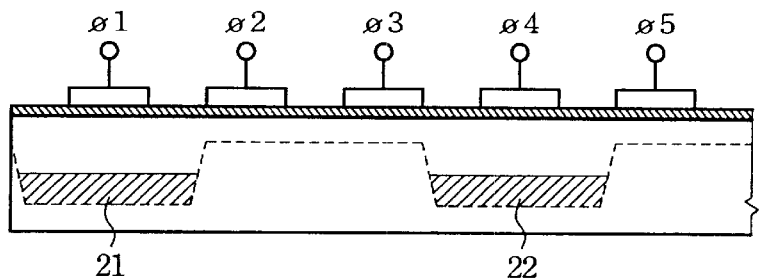
FIGS. 2A–2D are sectional views showing the operation of the CCD analog shift register.
Figure 2B:
Figure 2C:
Figure 2D:
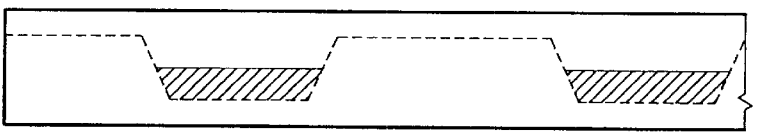
Figure 2E:
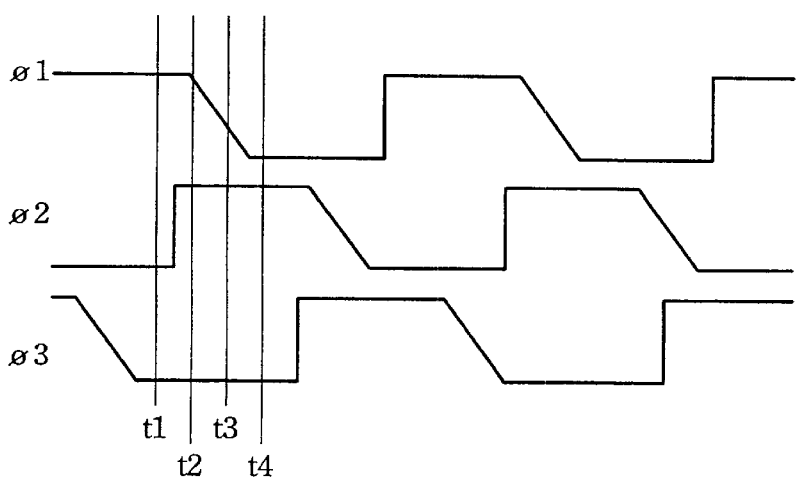
FIG. 2E is a schematic diagram showing the stages for the charge shifts during various time intervals.
Figure 3A:
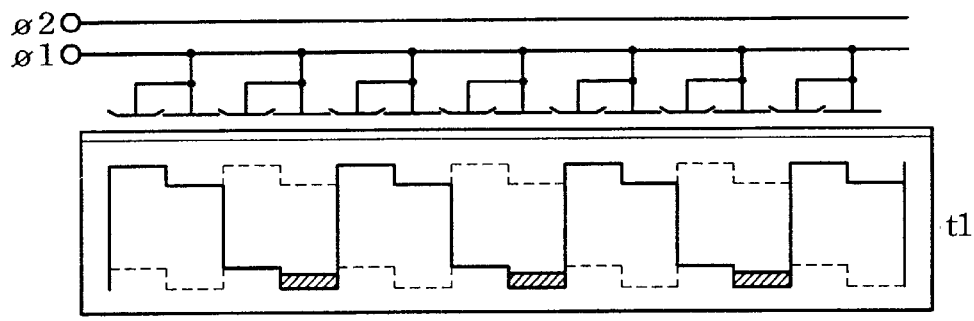
FIGS. 3A–3C are a schematic diagrams showing the operation of a two-phase drive.
Figure 3B:
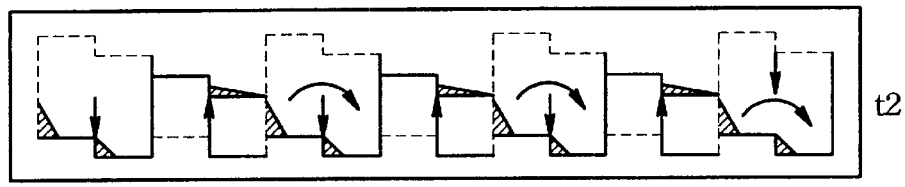
Figure 3C:
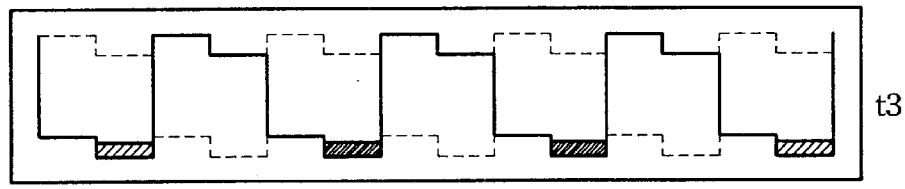
Figure 3D:
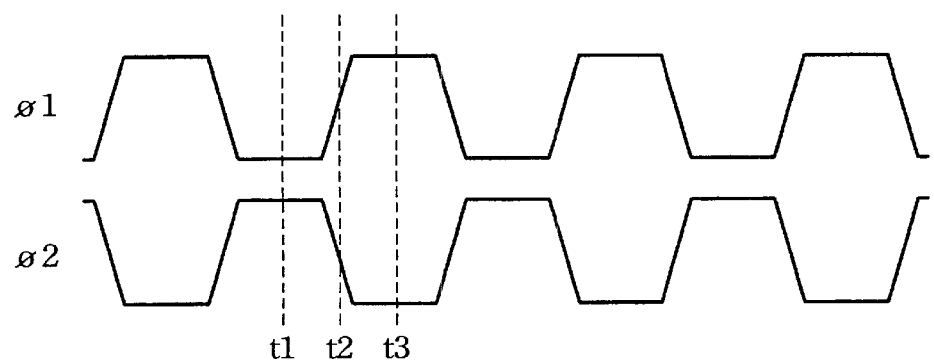
FIG. 3D is a schematic diagram showing the charge shifts during various clock cycles for a two-phase drive.
Figure 4A:
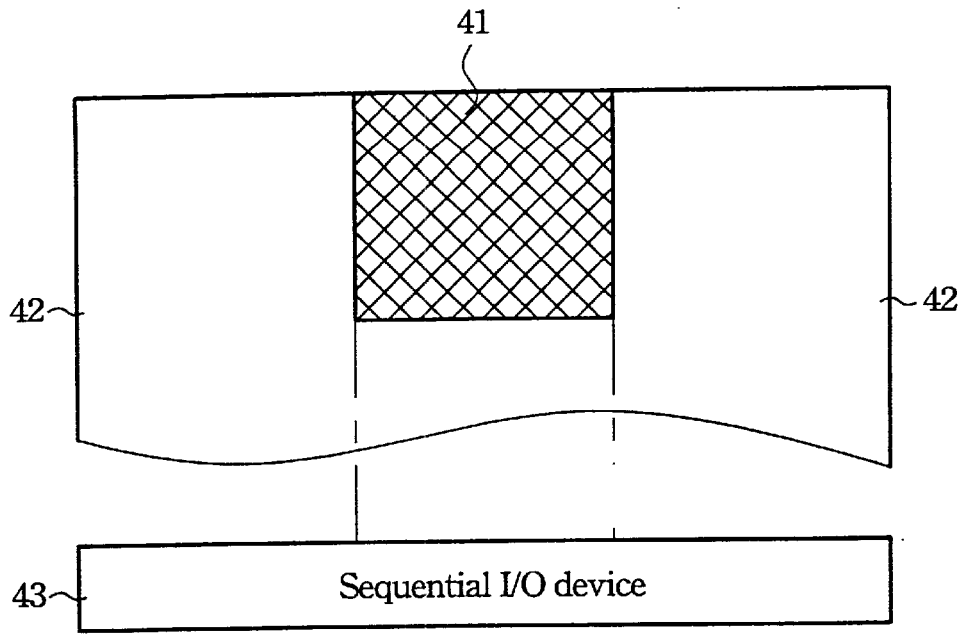
FIG. 4A is schematic diagram showing a document having a target area and an unselected area.
Figure 4B:
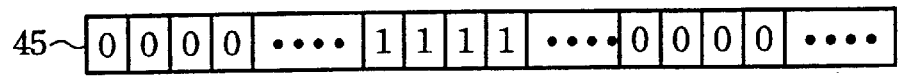
FIG. 4B is schematic diagram showing a memory allocation for recording the target area and the unselected area of the document as shown in FIG. 4A according to their correspondent positions.

For instance, take FIG. 4A as an example. The shaded area in FIG. 4A represents pixels of a target area 41 and the rest area pixels of unselected area 42. After being scanned by a sequential I/O device 43 line by line, each line of the image will be stored in a memory device 45. The number of memory locations for each line in the memory device 45 is the same as the number of cells in the sequential I/O device 43 for each line. Accordingly, in the memory device 45, there are marks for indicating target area and also marks for indicating unselected area. The marks are in a format as illustrated in FIG. 4B. For each memory location corresponding to a pixel in the target area, the memory location will be marked as "1". And for each memory location corresponding to a pixel in the unselected area, the memory location will be marked as "0".

Figure 4C:
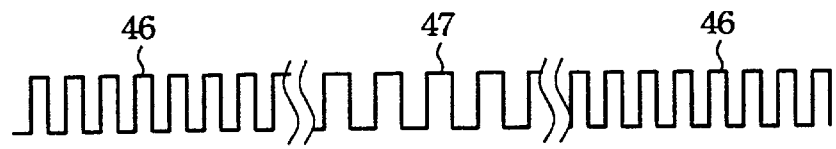
FIG. 4C is a clock diagram for processing a target area and unselected areas based on normal clock cycles and dummy clock cycles.

Since each line of image may contain pixels of target area as well as pixels of unselected area, therefore the clocks for reading a line will be different. As illustrated in FIG. 4C, the dummy clocks 46, which are generated for reading pixels of unselected area, are faster than the normal clocks 47, which are generated for reading target area, because the image quality of the unselected area is not concerned. Eventually, the speed for scanning a line using the combination clocks will be faster than using uniform clocks. We may use a simple example to illustrate this fact. For instance, processing a pixel based on normal clocks will require one clock. Then, scanning 10 pixels based on normal clocks will need 10 clocks. If there are only 5 out of the 10 pixels are in the target area, we may use dummy clocks to process the rest 5 pixels in the unselected area. As a result, the overall clocks required will be 5 normal clocks +5 dummy clocks, which are faster than 10 normal clocks. For this reason, using the combination clocks to scan images will be faster than using only uniform clocks.

The inventive method comprises the steps of: first, an user may mark unselected area of a document via an user interface and identify the locations of the pixels in the unselected area by "0" and identify the locations of the pixels in the target area by "1". Then, determine if each pixel of the document has been marked. If yes, the system will generate dummy clocks to process unselected pixels. If not, the speed of the clocks remains normal.

Figure 5:
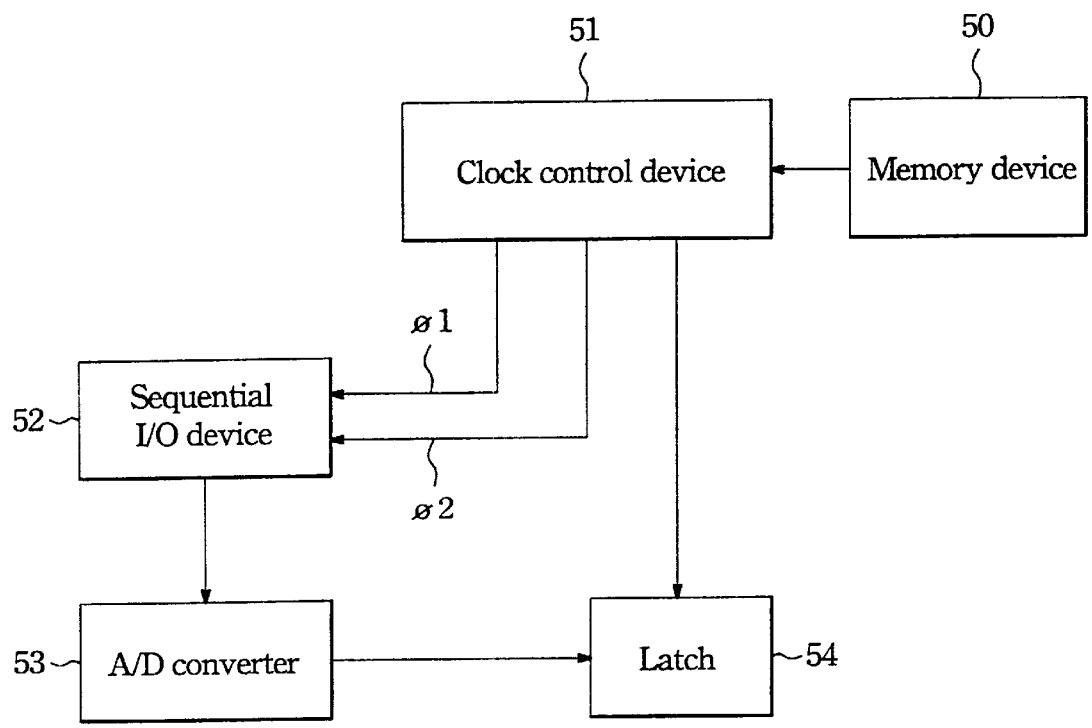
FIG. 5 is a functional block diagram showing the preferred embodiment of the present invention.

According to the rationale, the preferred embodiment of the present invention is illustrated in FIG. 5 for controlling the transfer pulses of the sequential I/O device. With reference to FIG. 5, a memory device 50 has a plurality of memory locations for marking the target area and unselected area of the document. If the pixel scanned is determined to be in the target area, its corresponding location in the memory device 50 will stored a "1" and "0" if otherwise. The number of memory locations in the memory device 50 for each line is the same as the number of cells in the sequential I/O device 52. The memory device 50 sequentially generates a mark to a clock control device 51 according to the clocks. The clock control device 51 will then generate transfer pulses $\phi 1$ or $\phi 2$ according to each mark generated by the memory device 50. If the mark representing a "1", then the transfer pulse $\phi 1$ or $\phi 2$ will be normal clocks. In contrast, if the mark representing a "0", then the the transfer pulse $\phi 1$ or $\phi 2$ will be dummy clocks. Basically, the transfer pulses $\phi 1$ and $\phi 2$ are designed based on two-phase drive. When the pixels read are determined to be selected, the transfer pulses $\phi 1$ and $\phi 2$ will be normal. Otherwise, the transfer pulses $\phi 1$ and $\phi 2$ will be controlled by dummy clocks.

The transfer pulses $\phi 1$ and $\phi 2$ are input to the sequential I/O device 52, which may be a CCD. The structure of the CCD is the same as a conventional CCD. It reads each pixel according to the transfer pulses $\phi 1$ and $\phi 2$. Each signal charge will then be generated and output to an AND converter 53 to be converted into digital signals. The digital signals generated by A/D converter 53 will be sent to a latch 54 according to each mark from the memory device 50. The latch 54 is coupled to the A/D converter 53 to latch data output of the A/D converter 53. If the digital signal is a "1", the latch 54 will send a latch signal to latch the output of the AND converter 53. If, the digital signal is a "0", the latch 54 will be disabled to ignore the output of the A/D converter 53. Then, the latched data will be forwarded to the system bus for image processing.

The method and apparatus according to the present invention can efficiently improve the pixel reading speed because the dummy clocks are faster than normal clocks. Moreover, since the structure of the preferred embodiment of the present invention is very simple, it can efficiently improve the image quality without much of additional manufacture cost, and further improve the quality of the products.

While this invention has been described with reference to an illustrative embodiment, this description is not intended to be construed in a limiting sense. Various modifications and combinations of the illustrative embodiment, as well as other embodiments of the invention, will be apparent to persons skilled in the art upon reference to the description. It is therefore intended that the appended claims encompass any such modifications or embodiments.

What is claimed is:

1. A dummy clock control method for a sequential I/O device comprising the steps of:

scanning a document consisting of a target area and an unselected area;

marking each of first pixels corresponding to said target area within said document with first marks and each of second pixels corresponding to said unselected area within said document with second marks;

a plurality of transfer pulses responsive to dummy clocks when processing said second pixels;

generating a plurality of transfer pulses responsive to normal clocks when processing said first pixels, wherein said dummy clocks are faster than said normal clocks; and reading said first and second pixels according to said plurality of transfer pulses.

2. The method as claimed in claim 1, wherein said plurality of transfer pulses are based on a two-phase drive.

3. A dummy control apparatus for a sequential I/O device comprising:

memory means comprising first pixels and second pixels, wherein each of said first pixels are marked by first marks indicating a target area within a document and each of said second pixels are marked by second marks indicating an unselected area within a document;

clock control means coupled to said memory means for generating a plurality of transfer pulses and a control signal in response to an output of said memory means wherein said transfer pulses are responsive to dummy clocks and normal clocks, said dummy clocks being faster than said normal clocks, said dummy clocks being utilized to process said second pixels and said normal clocks being utilized to process said first pixels;

sequential I/O means for generating a plurality of signal charge in response to said plurality of transfer pulses;

analog/digital converting means coupled to said sequential I/O means for converting said signal charge into digital signals; and latching means coupled to said analog/digital converting means and said clock control means for latching an output of said analog/digital converting means in response to said control signal from said clock control means.

4. The apparatus as claimed in claim 3, wherein said plurality of transfer clocks are two-phase drive.

5. The apparatus as claimed in claim 3, wherein said sequential I/O means is a charge coupled device.

6. The apparatus as claimed in claim 3, wherein the number of memory locations in said memory means is the same as the number of cells in said sequential I/O means.

* * * * *